United States Patent
Skolnick et al.

[15] 3,700,309
[45] Oct. 24, 1972

[54] NONRESONANT INTERFEROMETRIC OPTICAL ISOLATOR

[72] Inventors: Michael L. Skolnick, West Hartford; Carl J. Buczek, Manchester, both of Conn.

[73] Assignee: United Aircraft Corporation, East Hartford, Conn.

[22] Filed: March 15, 1971

[21] Appl. No.: 124,137

[52] U.S. Cl. .................................. 350/163, 356/113
[51] Int. Cl. ........................................... G02b 27/00
[58] Field of Search ..................... 350/163; 356/113

[56] References Cited

UNITED STATES PATENTS 3,586,416  6/1971  De Bitetto ............. 350/163 X

Primary Examiner—David Schonberg
Assistant Examiner—Toby H. Kusmer
Attorney—Anthony J. Criso

[57] ABSTRACT

A nonresonant interferometric optical isolator is provided with an element having an index of refraction anisotropy. The isolator is a device having two beam paths and any input beam which passes through is split into two individual component beams, with each component being transmitted along a separate path before interfering with the other component and exiting from the isolator. The anisotropy causes the effective optical length through the isolator to be responsive to the direction of travel of an optical beam through the element so that an optical beam passing through the anisotropic element in a forward direction experiences an optical length which is different from the optical length the beam would experience traveling in a reverse direction. The two beam paths of the isolator have effective optical lengths in the reverse direction which differ from each other by half a wavelength and the components of an optical beam transmitted through the isolator in the reverse direction undergo destructive interference and leave the isolator along a path which is different from the input beam direction. Therefore, an input beam of optical energy is readily transmitted through the isolator in the intended direction, but any feedback beam passes through the isolator in a reverse direction and exits the isolator along a path which is different from the input beam direction.

6 Claims, 1 Drawing Figure

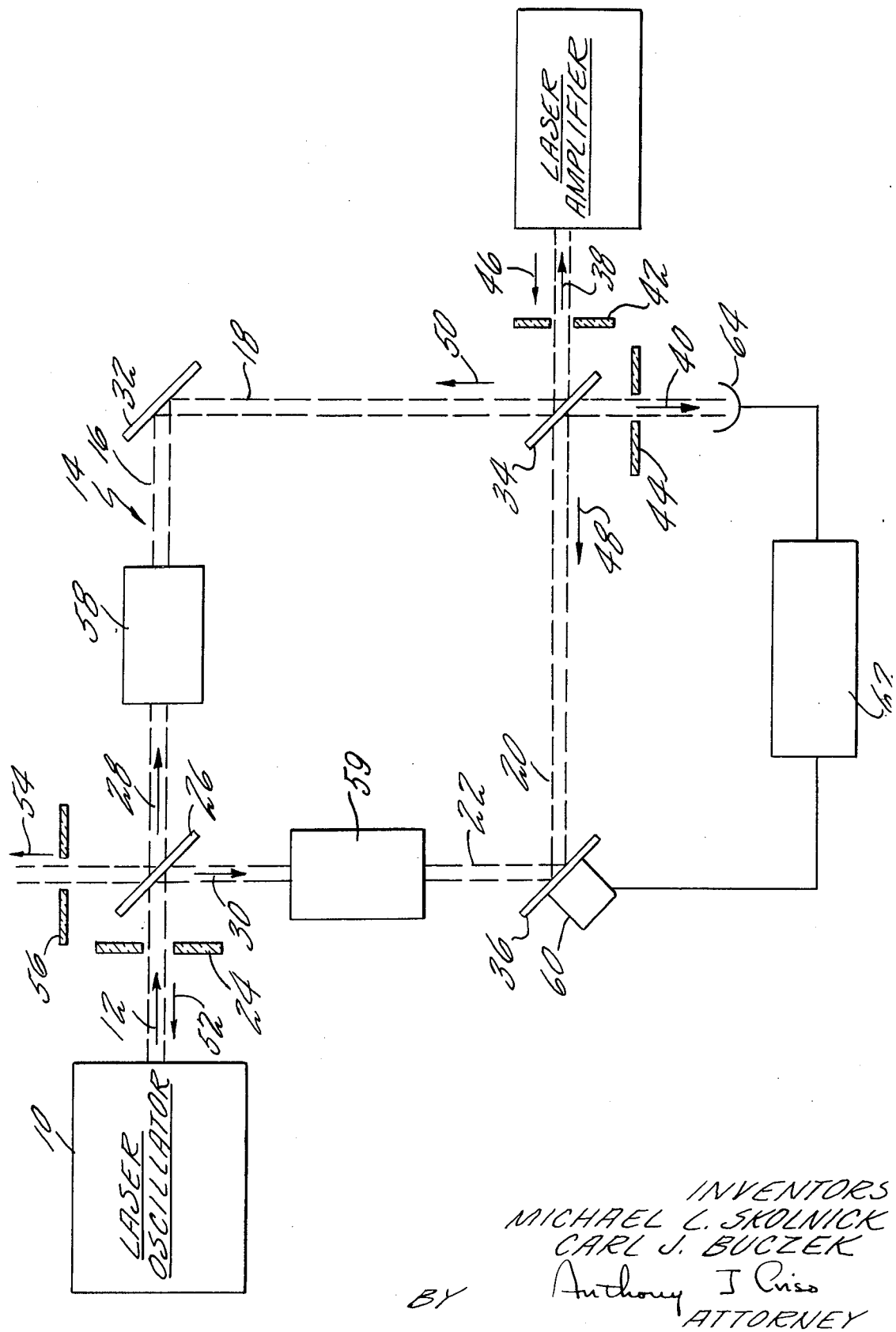

NONRESONANT INTERFEROMETRIC OPTICAL ISOLATOR

BACKGROUND OF THE INVENTION

1. Field of Invention

This invention relates to optical systems and more particularly to nonresonant interferometric optical isolator systems.

2. Description of the Prior Art

Conventional optical isolators as they are known in the prior art are limited because their operation is dependent upon the polarization characteristics of the incident electromagnetic radiation. This characteristic is undesirable since it requires that the optical input to an isolator either be inherently linearly polarized or else linearly polarized locally, the latter being an inefficient use of the energy contained in the incident beam. Also, the available devices which can linearly polarize beams of optical radiation (electromagnetic radiation having a wavelength very much smaller than the characteristic dimensions of the physical components involved) are limited in their ability to cause a desired linear polarization efficiently and effectively, particularly at the infrared wavelengths which may be of interest particularly in many laser applications.

In addition to the conventional or polarization-dependent optical isolators, the prior art includes resonant interferometric isolators; however, once a resonant system is tuned to a particular wavelength, it will not function at alternate wavelengths and different problems arise. For example, if a resonant (multiple paths) isolator is used in conjunction with a laser oscillator, effective isolation of the oscillator requires that the laser be a very stable, single output frequency device.

A third type of known optical isolator is a nonresonant interferometric system which relies on a change in the velocity of propagation caused by the Fresnel drag effect when electromagnetic radiation is transmitted through a moving medium. This type nonresonant isolator is undesirable because it relies on the mechanical movement of an appropriate medium along an optical path of the device. Further, the Fresnel drag effect is small at certain wavelengths and an isolator is not practical when the system is operated at some wavelengths of particular interest, as for example in the infrared portion of the spectrum.

SUMMARY OF THE INVENTION

A principal object of the present invention is to provide an isolator of optical radiation which is independent of both the polarization characteristics and the wavelength of the radiation. A further object is to provide a nonresonant isolator which is suitable for use at infrared wavelengths.

According to the present invention, an element having an index of refraction anisotropy is disposed in one leg of a Mach Zehnder interferometer so that electromagnetic radiation passed across this leg in a forward direction experiences a different effective optical path length than if passed across the leg in a reverse direction. An input source of optical radiation which enters the interferometer is split into two component beams, with each component passing through one of the beam paths in the intended forward direction before interfering in phase and exiting the interferometer. Any optical beam which enters the interferometer in a reverse direction similarly splits into two component beams, but each component passes through one of the beam paths in the reverse direction; the anisotropic element introduces a phase difference between the two component beams which then interfere out of phase and exit the isolator in a direction different from that of the input beam.

An advantage of the present invention is its ability to transmit a high power input beam over a range of frequencies without mechanical movement of the anisotropic element; the power transmitted through both the polarization dependent and resonant interferometric isolators is limited by the power handling capacity of the nonreciprocal element in such devices. By way of contrast, the nonresonant interferometric isolator according to this invention has two paths which share the power passing through the interferometer, each path conducting approximately half the total power; therefore, approximately twice as much power can be handled as in a single path device. A further advantage of the present invention is the high extinction ratio (ratio of transmission of the device in a forward direction divided by the transmission in a reverse direction) which is possible because of the precision with which the phase balance between the two paths of the interferometer can be maintained as opposed to the limited extinction ratio obtainable with simply a Faraday rotator and the associated linear polarizing devices.

Also, the present invention is especially useful to connect laser oscillator apparatus with laser amplifier apparatus by optical means which transmits an optical beam from the oscillator to the amplifier while isolating the oscillator from feedback beams which originate in the amplifier and are propagated in the reverse direction.

Similarly, the invention is applicable to optical radar systems. Since this nonresonant interferometric isolator has a high extinction ratio capability, a high degree of separation between the transmitter and receiver channels in a common telescope optical system and therefore a relatively sensitive optical radar system are possible.

The foregoing and other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a simplified schematic of a nonresonant interferometric optical isolator in accordance with the present invention, applied to a laser oscillator-amplifier system.

DESCRIPTION OF THE PREFERRED EMBODIMENT

Referring to the drawing, a laser oscillator 10 produces an input beam 12 which travels in a forward direction as indicated. The input beam enters a nonresonant interferometric optical isolator 14 which is a four-port circulator having four beam path legs 16, 18, 20 and 22. Upon entry into the isolator through an input port 24, the beam 12 is divided by an input beam splitter 26 into an input beam clockwise component 28 and an input beam counterclockwise component 30. The transmission and reflection characteristics of the beam splitter are selected so that the input beam components 28 and 30 are of equal intensity.

Passage of the input beam 12 through the isolator 14 in a forward direction is effected when the clockwise component 28 is transmitted along the leg 16, is reflected by a totally reflecting clockwise mirror 32, and is transmitted along the leg 18 arriving at an output beam splitter 34 which has optical characteristics identical to those of the previously mentioned beam splitter 26. Additionally, the counterclockwise component 30 is transmitted along the leg 22, is reflected by a totally reflecting counterclockwise mirror 36, and is transmitted along the leg 20 also arriving at the beam splitter 34. The input beam components 28 and 30 interfere, essentially in phase, at the beam splitter 34 to produce an output beam 38 and a control fringe beam 40. The relative intensity of the beams 38 and 40 depends upon the exact phase relationship of the two interfering beams at the beam splitter 34 (the clockwise component 28 and the counterclockwise component 30); this phase relationship can be made insensitive to the frequency of the input beam 12 by making the optical path lengths between the beam splitters 26 and 34 identical for both the clockwise and counterclockwise directions of travel.

The output beam 38 exits the isolator through an output port 42, and the control fringe beam 40 exits the isolator through a fringe port 44.

A feedback beam 46, entering the interferometer in a reverse direction through the port 42, is split into two equal intensity feedback component beams, a clockwise feedback component 48 and a counterclockwise feedback component 50; the reverse direction of travel through the isolator is counterclockwise across the legs 18 and 16 and clockwise across the legs 20 and 22. Interference of the component beams 48 and 50 at the beam splitter 26 produces a feedback output beam 52 which exits through the port 24 and a rejected beam 54 which exits through a rejection port 56; the relative intensity of the beams 52 and 54 to the beam 46 corresponds exactly to the relative intensity of the beams 38 and 40 respectively to the beam 12.

The transmission of an optical beam from the port 24 to the port 42 could be identical to an optical transmission from the port 42 to the port 24. However, by inserting a stationary or fixed element 58 having an anisotropic index of refraction along the path of transmission in the leg 16 of the interferometer, the effective optical length between the beam splitters 26 and 34 is different depending upon whether the light travels in the forward or the reverse direction through the anisotropic element. The element 58 may be for example, a Faraday rotator flanked by quarter wave plates which are aligned with the direction of polarization in the case of a linearly polarized beam. Those familiar with changing the phase of optical radiation will recognize that the element 58 may be other than just described depending on the characteristic of the incoming radiation; the significant criterion is that the element 58 introduces a directionally dependent phase difference of a half wavelength. According to the invention, the nonreciprocal index of refraction introduced in the leg 16 is selected to produce a half wavelength optical length anisotropy therein although an anisotropy which produces a directional optical length difference of any odd integer number of half wavelengths of the input beam will perform satisfactorily. Further, it is possible to dispose nonreciprocal elements in each of the paths through the interferometer as long as the forward/reverse optical length difference is an odd integer number of half wavelengths. In the isolator shown in the FIGURE for example, the element 58 and a second anisotropic index of refraction element 59 are used.

When an input beam enters the isolator and is divided at the input beam splitter into the two component beams which interfere at the output beam splitter to produce the output beam at the port 42, a feedback beam often results. The feedback beam enters the port 42 and is divided at the beam splitter 34 into two component beams which interfere at the beam splitter 26 to produce a feedback output beam 52 and a rejected beam 54. However, due to the anisotropy in the leg 16 of the interferometer, the transmission from the input port 24 to the output port 42 is different than the transmission from the port 42 to the port 24. By adjusting the interferometer to produce a maximum transmission from the input port 24 to the port 42, the transmission from the output port 42 to the port 24 will be minimum since the anisotropy in the isolator is equal to one-half a wavelength.

A length transducer such as a piezoelectric device 60 actuates the mirror 36 in the interferometer and adjusts the beam path legs 20 and 22 such that a maximum transmission from the port 24 to the port 42 results. This desired operating condition can be controlled either by maximizing the intensity of the output beam 38 which occurs through the port 42 or minimizing the control fringe beam 40 which exits through the port 44.

A conventional hill climbing servo system 62 dithers the mirror 36, senses the control fringe beam 40 with a detector 64, and slaves the optical path length through the interferometer along the legs 20 and 22 to the optical path along the legs 16 and 18.

Although the invention has been shown and described with respect to a preferred embodiment thereof, it should be understood by those skilled in the art that various changes and omissions in the form and detail thereof may be made without departing from the spirit and the scope of the invention.

Having thus described a typical embodiment of our invention, that which we claim as new and desire to secure by Letters Patent of the United States is:

1. A nonresonant interferometric optical isolator comprising:
    an interferometer which has first and second independent beam paths therethrough; and
    a fixed anisotropic index of refraction element which is disposed in said first beam path to cause the effective optical length of said first beam to be dependent on the direction of travel of an optical beam across said beam path, wherein the optical length of an optical beam when passed across said first beam path in a forward direction is different than the optical length of an optical beam when passed across said first beam path in a reverse direction by an odd integer number of half wavelengths.

2. An optical isolator according to claim 1 wherein the odd integer is one.

3. An optical isolator according to claim 1 wherein an element having an index of refraction anisotropy is disposed in each of the beam paths.

4. In combination, a Mach Zehnder interferometric circulator which has a first and a second beam path which transmit electromagnetic radiation having an optical wavelength therethrough;

a fixed anisotropic index of refraction element which is disposed in said first beam path causing the optical path length for the radiation transmitted in a forward and reverse direction across said first beam path to be different by an odd number of half of said wavelengths; and feedback control means to maintain the difference in the optical path length of each of the two beam paths in the forward direction at substantially an integer number of said wavelengths.

5. An optical isolator according to claim 4 wherein the optical length in the forward direction is the same for both said first beam path and said second beam path.

6. An optical isolator according to claim 4 wherein the difference in optical path length in the forward and reverse directions across said first beam path is one-half of a said wavelength.

* * * * *